(12) United States Patent
West et al.

(10) Patent No.: US 6,917,366 B1
(45) Date of Patent: Jul. 12, 2005

(54) SYSTEM AND METHOD FOR ALIGNING MULTI-CHANNEL CODED DATA OVER MULTIPLE CLOCK PERIODS

(75) Inventors: Michael G. West, Portland, OR (US); Jamie J. LeVasseur, Vancouver, WA (US)

(73) Assignee: Pixelworks, Inc., Tualatin, OR (US)

( * ) Notice: Subject to any disclaimer, the term of this patent is extended or adjusted under 35 U.S.C. 154(b) by 615 days.

(21) Appl. No.: 09/826,538

(22) Filed: Apr. 4, 2001

Related U.S. Application Data (60) Provisional application No. 60/194,557, filed on Apr. 4, 2000.

(51) Int. Cl.[7] ............................................... G09G 5/36
(52) U.S. Cl. ...................... 345/558; 345/505; 345/559; 370/537
(58) Field of Search ................................ 365/556, 559, 365/505, 99; 375/366, 355; 370/537; 345/558, 547, 213, 530; 710/22, 29

(56) References Cited

U.S. PATENT DOCUMENTS

| | | | | |
|---|---|---|---|---|
| 4,647,986 A | * | 3/1987 | Vaughn et al. ................ 386/91 |
| 5,887,039 A | * | 3/1999 | Suemura et al. ............. 375/365 |
| 6,151,334 A | * | 11/2000 | Kim et al. .................... 370/468 |
| 6,512,804 B1 | * | 1/2003 | Johnson et al. .............. 375/372 |
| 6,578,092 B1 | * | 6/2003 | Lau et al. ...................... 710/29 |
| 6,578,153 B1 | * | 6/2003 | Sankey et al. ............... 713/400 |

OTHER PUBLICATIONS

Digital Display Working Group (DDWG); *Digital Visual Interface DVI, Revision 1.0*; Apr. 2, 1999; pp. 1–76.

* cited by examiner

Primary Examiner—Matthew C. Bella
Assistant Examiner—Hau Nguyen
(74) Attorney, Agent, or Firm—Marger Johnson & McCollom, P.C.

(57) ABSTRACT

A system and method is provided for aligning multi-channel coded data over multiple clock periods. Data is received through a plurality of data channels and stored in a plurality of latches or queues. Data is scanned to determine whether a valid data transition has occurred. Once a valid transition is detected on all of the plurality of data channels, data is substantially simultaneously read out of the latches or queues resulting in synchronized or aligned data being provided at the output.

24 Claims, 7 Drawing Sheets

SYSTEM AND METHOD FOR ALIGNING MULTI-CHANNEL CODED DATA OVER MULTIPLE CLOCK PERIODS

This application claims priority to U.S. Provisional Patent Application Ser. No. 60/194,557 filed Apr. 4, 2000, which is incorporated by reference in its entirety.

BACKGROUND OF THE INVENTION

1. Field of the Invention

This invention relates to a system for visually displaying digital image data and, more particularly, to a system for aligning multi-channel coded data over multiple clock periods.

2. Background of the Invention

An industry group calling itself the Digital Display Working Group (DDWG) published, on Apr. 2, 1999, revision 1.0 of the Digital Visual Interface (DVI) specification. The DVI specification is used here as an exemplary backdrop to the present invention. A person skilled in the art should recognize that the invention could be implemented in a variety of other settings where multi-channel coded digital data requires alignment over multiple clock periods.

The DVI specification provides a high-speed digital connection that is display technology independent. The DVI specification is primarily focused at providing a connection between a computer and its display device. The DVI specification defines a DVI connector that is compatible with existing Video Graphics Array (VGA) connectors. The DVI further provides for a digital interface that allows all content to remain in the loss-less digital domain from creation to consumption. The DVI specification defines an interface that is interoperable with other compliant devices.

The typical DVI link comprises three serial data streams or channels that are transmitted together with a single reference clock signal. The DVI specification allows for considerable skew between each of the three data channels. This skew renders difficult processing data. Without removing the skew by aligning the data channels, the resultant image is distorted.

Accordingly, a need remains for a system and method capable of aligning data transmitted over multiple channels and clock periods.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

Figure 1:
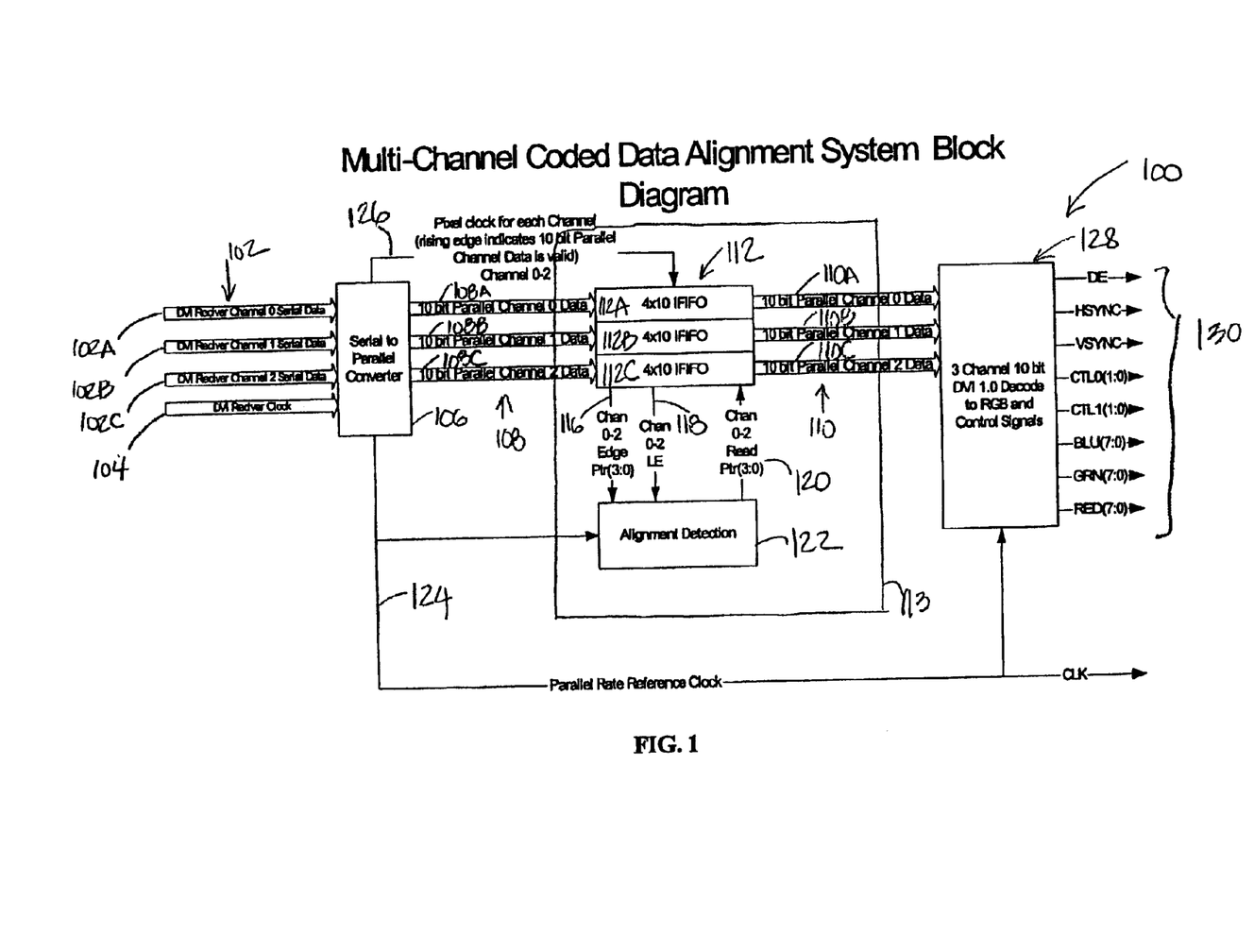
FIG. 1 is a block diagram of an embodiment of a system of the present invention.

Referring to FIG. 1, a multi-channel coded data alignment system 100 receives digital image data serially transmitted over a plurality of input serial data channels 102 along with a reference clock 104. The plurality of input serial data channels 102 might include, for example, the three 10-bit serial channels 102A, 102B, and 102C detailed in the DVI specification. The invention, however, is not limited in the number or capacity of channels 102.

Each of the plurality of input serial data channels, e.g., channel 102A, transmits serial data that includes skew relative to serial data transmitted over another channels, e.g., channel 102B, and/or relative to the reference clock 104. For example, serial data transmitted over input serial channel 102A might include skew relative to serial data transmitted relative to input serial channel 102B and/or relative to reference clock 104. The DVI specification allows up to 60% skew between serial data transmitted on one channel, e.g., channel 102A, and serial data transmitted on another channel, e.g., channel 102B. Data transmitted on a first channel, e.g., channel 102A, might have a first skew, e.g., 32%, relative to a second channel, e.g., channel 102B, while a third channel, e.g., channel 102C, might have a second skew, e.g., 58%, relative to the first channel, e.g., channel 102A, and so on.

The plurality of serial data channels 102 provides the data to a serial to parallel converter 106. The serial to parallel converter 106 converts the serial data on serial channels 102 to parallel data transmitted on a corresponding plurality of parallel channels 108 responsive to the reference clock 104.

Additionally, the serial to parallel converter 106 generates a pixel clock 126 for each parallel data channels 108 and a parallel reference clock 124 according to the reference clock 104. The pixel clock 126 and the reference clock 124 might have the same rate or frequency as is assumed by the DVI specification from the transmitter requirements detailed therein. The invention, however, is not limited in this regard. No relationship is necessary between the pixel clock 126 and the reference clock 124, e.g., a phase or edge relationship is not necessary.

Example implementations of the serial to parallel converter 106 are contained in the DVI specification. There a serial stream from a DVI cable channel from 10-bits of serial data clocked at about 1.66 GHz is converted to 10-bits of parallel data clocked out at 166 MHz (maximum rate for a DVI single link application).

The serial to parallel converter 106 might include a front-end analog receiver that converts data received directly from transmission cables to usable voltages and currents to allow for the serial sampling to take place. The serial to parallel converter 106 determines the phase of the input signal for accurate sampling of the data bits coming in. Then, the serial to parallel converter 106 aligns the bits received to a divide-by-10 clock (not shown) relative to the data codes transmitted in the serial stream. The serial to parallel converter 106 is well known to those in the art and will not be discussed in further detail.

The parallel data transmitted on the plurality of parallel channels 108 contains skew. That is, the parallel data transmitted on one parallel channel, e.g., charnel 108A, might be skewed relative to parallel data transmitted on another parallel channel, e.g., channel 108B. In other words, the skew present on the serial data transmitted on the serial data channels 102 is also present in the parallel data transmitted on the parallel data channels 108. There is no fixed relationship between the channels.

The plurality of parallel data channels 108 provides the parallel data to an alignment circuit 113 comprising a queue circuit 112 and alignment detection circuit 122. The queue circuit 112 is adapted to store the parallel data on each of the parallel data channels, e.g., channels 108A, 108B, and 108C, responsive to a corresponding pixel clock 126.

Figure 2:
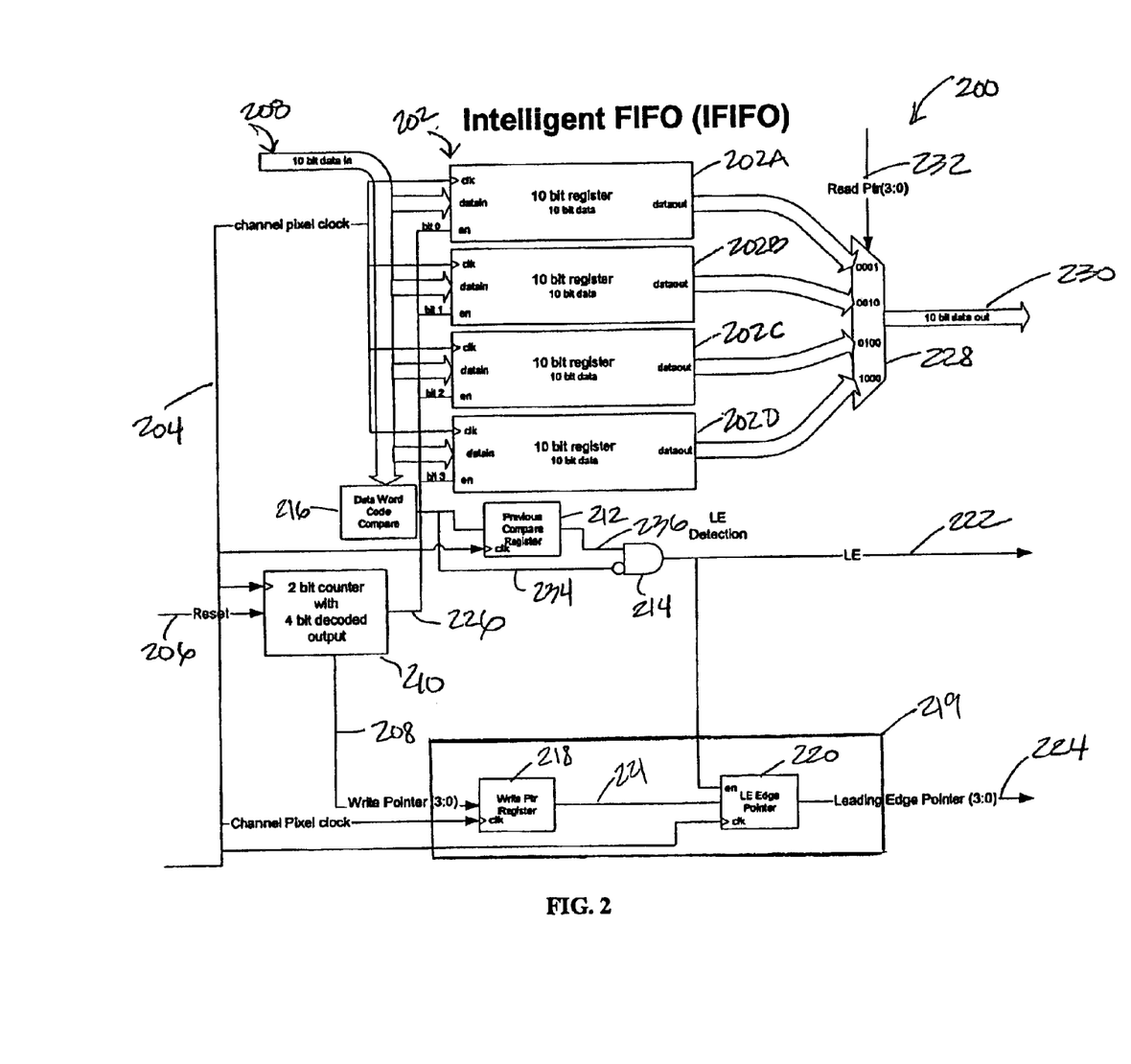
FIG. 2 is a block diagram of an intelligent queue circuit shown in FIG. 1.

FIG. 2 is a block diagram of a queue circuit 200 for each of the parallel data channels, e.g., channels 108A, 108B, or 108C (FIG. 1). Referring to FIG. 2, a parallel data channel 208 provides parallel data to a plurality of latches or queues 202, e.g., queues 202A, 202B, 202C, and 202D. The plurality of latches or queues 202 might be so called intelligent first-in-first-out (FIFO) latches but the invention is not limited in that regard. FIG. 2 shows 4 latches 202A, 202B, 202C, and 202D but the number or capacity of the queues does not limit the invention.

Each latch 202, e.g., FIFO latch 202A, might be adapted to store a word of parallel data responsive to the corresponding pixel clock 204. A person skilled in the art should recognize that latches 202 having various storing capabilities, for example, come within the scope of the present invention.

The parallel channel 208 provides parallel data to compare circuit 216. Compare circuit 216 is adapted to generate a match bit 234 for each word of parallel data. It does so by monitoring or scanning the parallel data for a predetermined code (not shown) indicative of a valid data transition. Once the compare circuit 216 finds the predetermined code (not shown), the match bit 234 is set. The predetermined code (not shown) might be a variety of different codes depending on the application. The DVI specification, for example, defines blanking codes between valid data.

The match bit 234 is provided to a register circuit 212 and a logic gate 214. The register circuit 212 and logic gate 214 compare the match bit 235 from a previous word to the match bit 234 from a present word. The logic gate 214 generates a leading edge signal 222 if the match bit 234 is different from match bit 235 responsive to the corresponding pixel clock 204. The register circuit 212 is clocked with the pixel clock 204. Referring briefly to FIG. 1, the queue circuit 112 provides leading edge signals 118 for each of the data channels 108, e.g., leading edge signal 222 of channel 208 (FIG. 2), to the alignment detection circuit 122.

Returning to FIG. 2, a counter circuit 210 is adapted to generate a write pointer 208 responsive to the channel pixel clock 204. The counter circuit 210 is clocked with the pixel clock 204. That is, the write pointer 208 is automatically incremented upon every pixel clock 204 rising edge. The counter circuit 210 might be a 2-bit counter with 4-bit decoded output but the invention is not limited in that regard. The write pointer 208 might be a 4-bit signal but the invention is not limited in that regard. The counter circuit 210 additionally receives a reset signal 206 indicative of a reset condition for the alignment circuit 113 (FIG. 1). If the reset signal 206 is set, the queue circuit 112 is reset. The counter circuit 210 additionally generates an enable signal 226 used to enable the plurality of latches 202.

The counter circuit 210 provides the write pointer to a latch circuit 219 adapted to generate a leading edge pointer 224 indicative of a beginning location of valid data. It does so by latching the write pointer 208 in write pointer register 218 and leading edge pointer latch 220 responsive to the leading edge signal 222 and the corresponding pixel clock 204. The leading edge pointer might be a 4-bit signal but the invention is not limited in that regard.

The latch circuit 219 comprises a register 218 adapted to register the write pointer 218 responsive to the pixel clock 204. The register 218 provides the latched write pointer 221 to the leading edge pointer latch 220. The latch 220, in turn, generates the leading edge pointer 224 when the leading edge signal 222 is set responsive to the pixel clock 204. Referring briefly to FIG. 1, the queue circuit 112 provides leading edge pointers 116 for each of the data channels 108, e.g., leading edge signal 222 of channel 208 (FIG. 2), to the alignment detection circuit 122.

Returning to FIG. 2, a multiplexer 228 receives the data output from the plurality of latches 202 and outputs aligned data 230 responsive to the read pointer 232. The generation of read pointer 232 is explained in detail with reference to FIG. 3. The multiplexer 228 provides the data 230 to a corresponding parallel data channel, e.g., channel 110A (FIG. 1). No skew is present between the data 230 on one channel, e.g., channel 110A (FIG. 1), and data on another channel, e.g., channel 110B (FIG. 1). That is, the data transmitted on channels 110 is aligned relative to each other.

Figure 3:
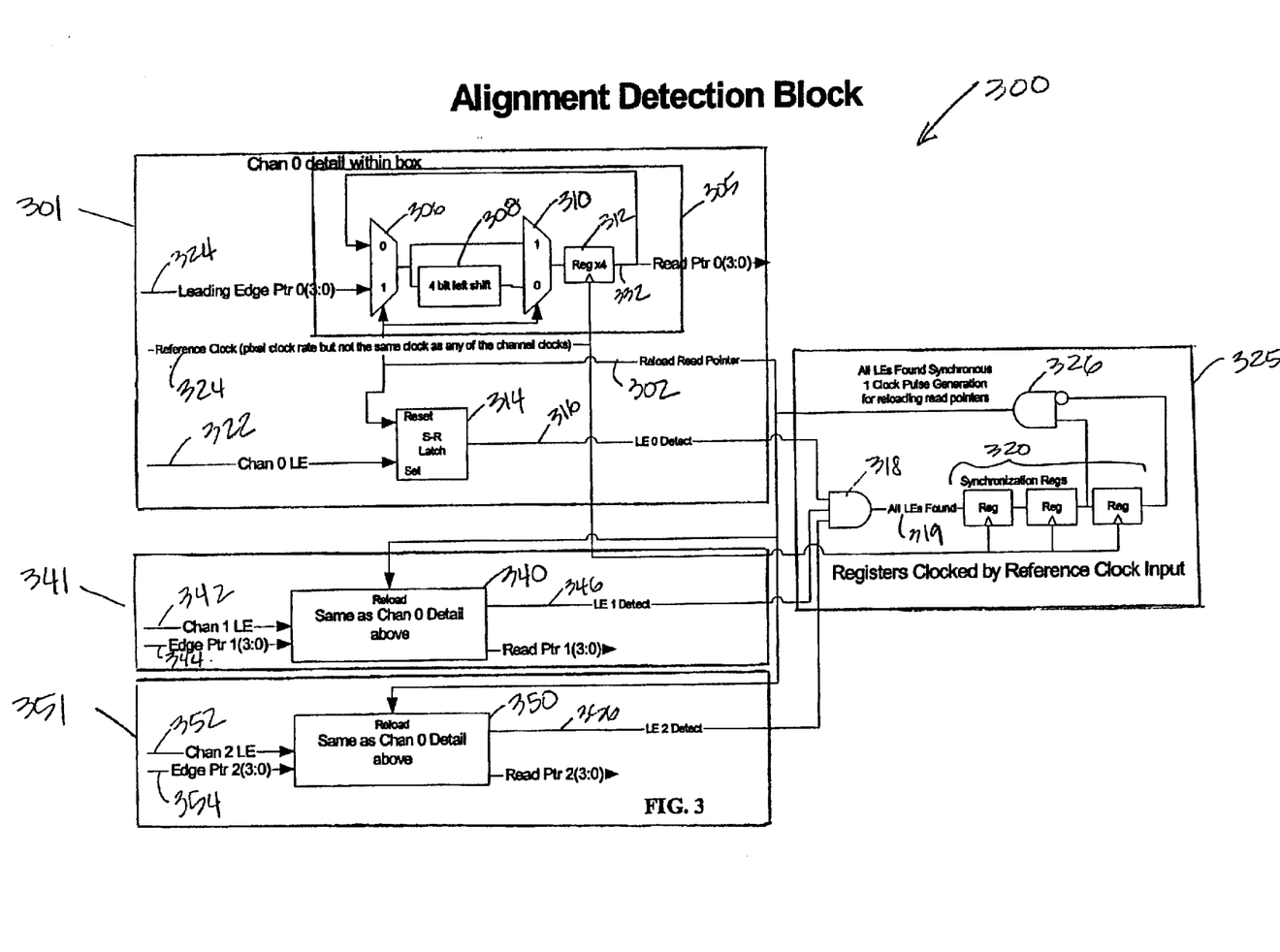
FIG. 3 is a block diagram of an alignment detection circuit shown in FIG. 1.

Referring to FIG. 3, the alignment detection circuit 300 comprises an alignment detection block, e.g., detection blocks 301, 341, and 351, for each parallel data channel 108 (FIG. 1) and a synchronization circuit 325. Each alignment detection block, like block 301, is adapted to generate the corresponding read pointer responsive to the reference clock 324.

The synchronization circuit 325 receives leading edge detect signals, e.g., leading edge detect signals 316, 346, and 356, from each of the alignment detection blocks 301, 341, and 351, respectively, at logic gate 318. The logic gate 318 generates a signal 319 when all leading edge detect signals 316, 346, and 356 are set. That is, the logic gate 318 sets the signal 319 when a valid data transition is detected on all data channels 108 (FIG. 1).

A plurality of serially connected synchronization registers 320 receives the signal 319 responsive to the reference clock 324. The synchronization registers 320 together with gate 326 generate a reload read pointer signal 302 when the leading edge signals 322, 342, and 352 from each of the data channels is set.

Each data channel is associated with an alignment detection block. For example, data channel 108A might be associated with alignment detection block 301. Each alignment detection block comprises a shift circuit 305 and a latch 314. The shift circuit 305 is adapted to receive the leading edge pointer, e.g., leading edge pointer 324, and generate the read pointer, e.g., read pointer 332, responsive to the reload read pointer signal 302.

The shift circuit 305 comprises a first multiplexer 306 adapted to multiplex between the leading edge pointer 324 and the read pointer 305 responsive to the reload read pointer signal 302. A shift register 308 shifts the signal 307 by a predetermined amount in a predetermined direction, e.g., four bits left. A second multiplexer 310 is adapted to multiplex between the signal 307 and the shifted signal 309 responsive to the reload read pointer signal 302. A register 312 provides the read pointer 332 responsive to the reference clock 324. The register 312 might be a 4-bit register but the invention is not limited in that regard. The reference clock operates at a pixel clock rate but it is a different clock than any of the pixel clocks, e.g., pixel clock 204.

The latch 314 is adapted to receive the leading edge signal and generate a leading edge detect signal for the corresponding parallel data channel responsive to the reload read pointer 302. The latch 314 might be an set-reset (SR) latch where the leading edge signal 322 is received at the set input and the reload read pointer signal 302 is received at the reset input but the invention is not limited in that regard.

Returning now to FIG. 1, the alignment circuit 113 provides the aligned parallel data to a plurality of output parallel data channels 110. The plurality of output data channels 110 might include, for example, three 10-bit parallel channels 110A, 110B, and 110C detailed in the DVI specification. The plurality of data channels 110 provide aligned parallel data, in turn, to a DVI decoder 128. The DVI decoder manipulates the received, aligned, parallel data and generates appropriate red, green, and blue (RGB) signals and control signals to drive a display device (not shown) responsive to the parallel reference clock 124. The decoder 128 is disclosed in detail in the DVI specification and will not be discussed further herein.

FIGS. 4–7 show another embodiment of the present invention. Referring to FIGS. 4–7, the alignment system 400 operates substantially similar to the alignment system 100 shown in FIG. 1. The primary difference is that an alignment circuit 413 operates responsive to a write enable pulse 402 allowing the use of pulse activated latches 500, e.g., latches 502A, 502B, 502C, and 502D, rather than the clocked registered latches or queues 200 (FIG. 2). As in the queues 200, the latches or queues 500 might be FIFO latches of any appropriate size.

Figure 6:
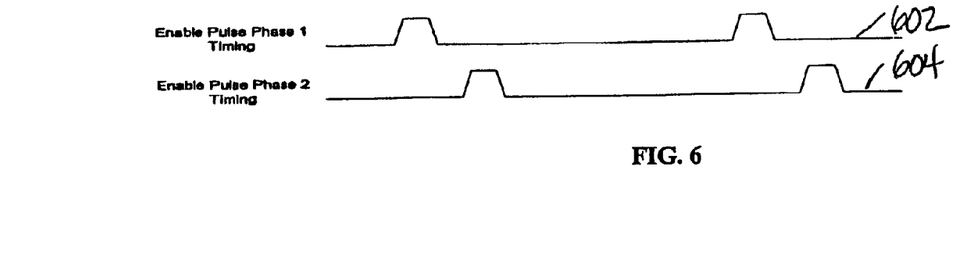
FIG. 6 is a timing diagram of the write enable pulse signals shown in FIG. 4.

The enable pulse 402 has a first phase 602 and a second phase 604 shown more particularly in FIG. 6.

Figure 5:
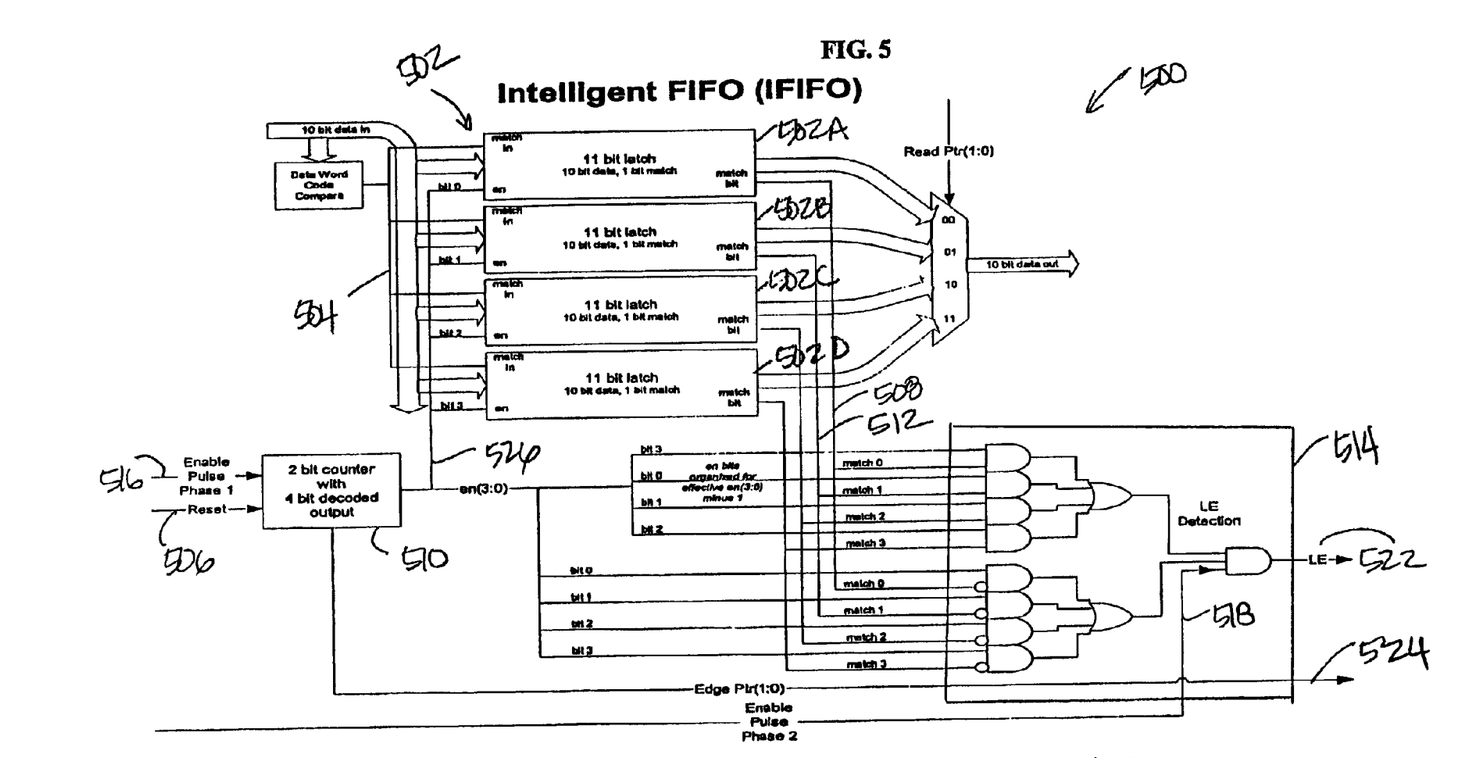
FIG. 5 is a block diagram of an intelligent queue circuit shown in FIG. 4.

The alignment circuit 500 generates a match bit 504 by scanning incoming data words or a predetermined code, much like the alignment circuit 200. But, in circuit 500, the match it is stored or latched into the latches 500 together with their corresponding data word. The logic circuit 514 compares the match bit, e.g., match bit 508, of a present word to a match bit, e.g., match bit 512, of a previous word to determine whether a valid data transition occurred. If a valid transition occurred, the logic circuit 514 sets the leading edge signal 516 responsive to a second phase of a write enable pulse 518.

Figure 4:
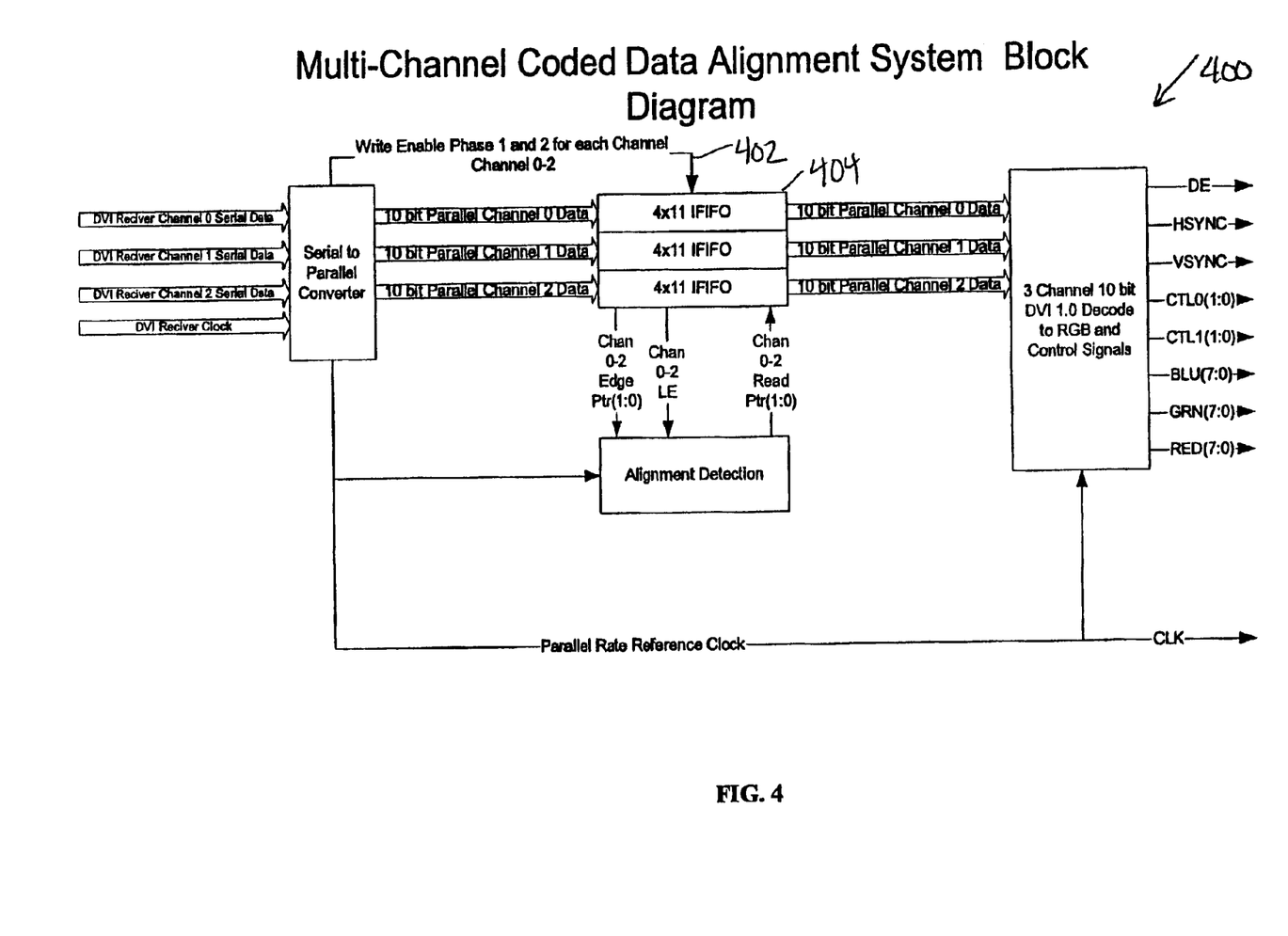
FIG. 4 is a block diagram of an alternative embodiment of a system of the present invention.

The counter circuit 510 generates the leading edge pointer 524 responsive to a first phase of a write enable pulse 516. The counter circuit 510 generates the enable signal 526 responsive to the first phase of the write enable pulse 516. The counter circuit 210 additionally receives a reset signal 206 indicative of a reset condition for the alignment circuit 404 (FIG. 4). If the reset signal 506 is set, the alignment circuit 404 is reset.

Figure 7:
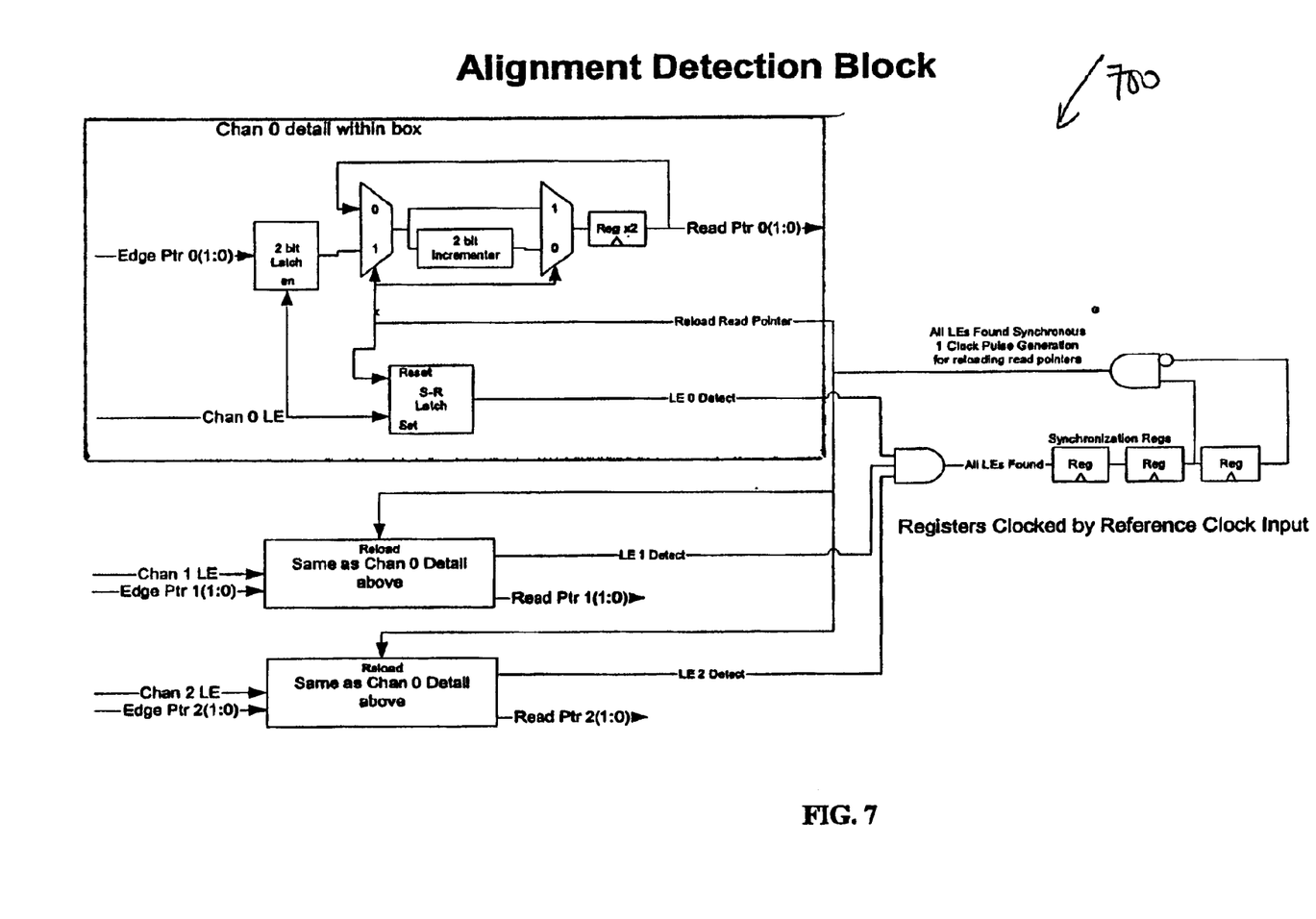
FIG. 7 is a block diagram of an alignment detection circuit shown in FIG. 4.

The alignment detection circuit 700 operates similarly to alignment detection circuit 400 shown in FIG. 4 and will not be discussed in further detail.

A person skilled in the art should now recognize that the invention is a system for alignment of multiple channels of coherent data that can be multiple clock periods out of phase to a reference clock. The data from multiple channels is aligned with references to unique codes per channel that indicate when input data is valid. Detection of the codes transitioning from identified codes to other codes or other codes to identified codes indicates when information data starts or stops relative to the other channels. The system aligns data by applying each channel asynchronously to the input of a FIFO latch or queue and monitoring each word of FIFO content for specific data code transitions. Detection of a data edge indicates where to set each read pointer for the FIFO latch or queue to start reading valid data. The read pointer of each FIFO latch or queue is latched until all of the latches or queues have detected a data edge. Once all the read pointers have been set to the edge of data for each latch or queue, the latches or queues can then be read simultaneously in the same clock period to produce an aligned multi-channel parallel synchronous output.

The system of the present invention operates well with the DVI specification. As mentioned above, the skew between channels can be up to 60% of the clock period in the DVI specification. This invention provides a solution that would handle the 60% skew as well as multiple clock periods of skew between data channels.

A person skilled in the art should recognize that an embodiment of the invention is integrated into an image processing monolithic integrated circuit. The invention, however, is not limited in this regard and might be implemented in any number of discrete logic and memory components as well as in software.

A person skilled in the art should understand that the format of codes and data streams might be applied in a different order, magnitude, or representation.

A person skilled in the art should recognize that the FIFO width and depth might be extended or reduced from the four FIFO words described in the example above.

It should be readily apparent that one or more devices that include logic circuit might implement the present invention. A dedicated processor system that includes a microcontroller or a microprocessor may alternatively implement the present invention.

The invention additionally provides methods, which are described below. Moreover, the invention provides apparatus that performs or assists in performing the methods of the invention. This apparatus may be specially constructed for the required purposes or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program and a method of operation of the program. The program is most advantageously implemented as a program for a computing machine, such as a general-purpose computer, a special purpose computer, a microprocessor, and the like.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories or separate machines where the memories or machines reside in the same or different geographic location. Where the memories or machines are in different geographic locations, they may be connected directly or through a network such as a local access network (LAN) or a global computer network like the Internet®.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. A person having ordinary skill in the art should recognize that the boxes described below might be implemented in different combinations, and in different order. Some methods may be used for determining a location of an object, some to determine an identity of an object, and some both.

Figure 8:
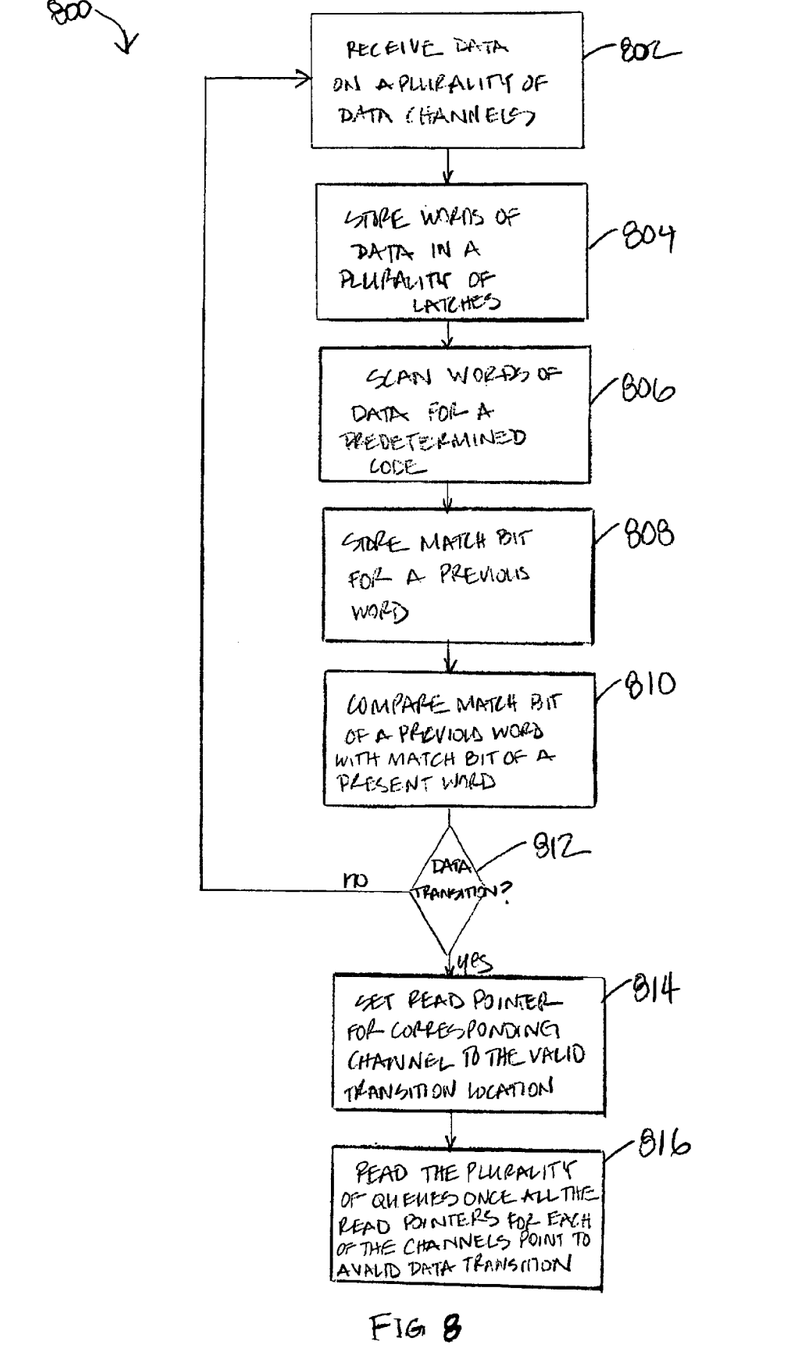
FIG. 8 is a flowchart of a method of aligning multi-channel coded data of the present invention.

Referring to FIG. 8, the method 800 of aligning multichannel coded data comprises receiving the data on a plurality of data channels (box 802). At box 804, the method 800 stores words of data in a plurality of queues or latches associated with corresponding data channels responsive to a channel pixel clock (FIG. 2) or responsive to an enable pulse signal (FIG. 5). The method 800 generates a match bit by scanning the words of data for a predetermined code (box 806). At box 808, the match bit is stored in a register (FIG. 2) or in a latch or queue along with the corresponding word (FIG. 5).

The method 800, at box 810, compares the match bit of a previous word to a match bit of a present word to detect a valid data transition. Put differently, a valid data transition is detected when the match bit from a previous word is different from the match bit of a present word. At box 812, the method 800 tests for a valid data transition. If no valid data transition occurred, the method 800 loops back to box 802. If a valid data transition occurred, the method 800 sets the read pointers for each channel to the location in the latch or queue where the valid transition occurred (box 814). At box 816, the method 800 waits to read the plurality of latches or queues until all of the read pointers for each data channel point to where valid data is located in the latches or queues.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A system to align digital image data, comprising:

a plurality of serial data channels, each channel transmitting corresponding serial data, the serial data on one serial channel having skew relative to the serial data on other serial channels;

a serial to parallel converter to convert the serial data on each of the plurality of serial data channels into parallel data on corresponding parallel data channels responsive to a serial reference clock; and an alignment circuit adapted to align the parallel data such that no skew is present between the parallel data on one parallel channel and the parallel data on other parallel channels responsive to a pixel clock;

wherein the serial to parallel converter generates a pixel clock for each parallel data channel and a parallel reference clock;

wherein the alignment circuit comprises:

a queue circuit to store the parallel data on each of the parallel data channels responsive to the corresponding pixel clock; and an alignment detection circuit to detect alignment of the parallel data stored in the queue circuit responsive to the parallel reference clock; and wherein the queue circuit for each of the parallel data channels comprises:

a plurality of FIFO latches, each FIFO latch to store parallel data responsive to the corresponding pixel clock;

a compare circuit to generate a match bit for each word of parallel data by monitoring the parallel data for a code;

a register circuit to generate a leading edge signal responsive to the corresponding pixel clock;

a counter circuit to generate a write pointer responsive to the corresponding pixel clock;

a latch circuit to generate a leading edge pointer by latching the write pointer responsive to the leading edge signal and the corresponding pixel clock; and a multiplexer circuit to receive parallel data stored in the plurality of FIFO latches and output aligned parallel data to a corresponding parallel data channel responsive to a corresponding read pointer.

2. The system of claim 1 wherein each FIFO latch stores a word of parallel data responsive to an enable signal; and wherein the counter circuit generates the enable signal responsive to the corresponding pixel clock.

3. The system of claim 2 wherein the counter circuit generates the enable signal further responsive to a reset signal.

4. The system of claim 1 wherein the code is a blanking code.

5. The system of claim 1 wherein the register circuit generates the leading edge signal by comparing a match bit for a presently stored word of parallel data with a match bit for a previously stored word of parallel data.

6. The system of claim 1 wherein the alignment detection circuit comprises:
an alignment detection block for each of the parallel data channels, each block to generate the corresponding read pointer responsive to the parallel reference clock; and
a synchronization circuit to receive a leading edge detect signal from each of the alignment detection blocks for each of the parallel data channels and generate a reload read pointer responsive to the parallel reference clock.

7. The system of claim 6 wherein each alignment detection block comprises:
a shift circuit to receive the corresponding leading edge pointer and generate the corresponding read pointer responsive to the reload read pointer;
a latch to receive the leading edge signal and generate a leading edge detect signal for the corresponding parallel data channel responsive to the reload read pointer.

8. The system of claim 7 wherein the shift circuit comprises:
a first multiplexer to select between the corresponding leading edge pointer and corresponding read pointer responsive to the reload read pointer;
a shift register to generate a shifted signal by shifting a first multiplexer output signal; and
a second multiplexer to select between the first multiplexer output signal and the shifted output signal responsive to the reload read pointer.

9. The system of claim 1 further comprising a decoder adapted to receive the aligned parallel data on corresponding parallel channels from the alignment circuit, the decoder meeting the digital visual interface specification version 1.0.

10. An alignment circuit receiving input parallel data on a plurality of input parallel data channels and generating output parallel data transmissible on a plurality of output parallel data channels, the input parallel data on one input parallel data channel having skew relative to the input parallel data on other input parallel data channels, comprising:
an alignment detection circuit to generate a plurality of read pointers corresponding to the plurality of input parallel data channels responsive to a parallel reference clock signal; and
a plurality of FIFO circuits corresponding to the plurality of input parallel data channels to generate the output parallel data responsive to the plurality of read pointers;
wherein the output data on one output channel has no skew relative to the output data on other output channels;
wherein the alignment detection circuit comprises an alignment detection block for each input data channel, each alignment detection block to generate a read pointer for each input data channel responsive to the parallel reference clock;

wherein each alignment detection block comprises:
a read pointer generating circuit to receive a corresponding leading edge pointer and generate the corresponding read pointer responsive to a reload read pointer signal; and
a latch to receive a leading edge signal and generate a leading edge detect signal for the corresponding input data channel responsive to the reload read pointer signal.

11. The alignment circuit of claim 10
wherein the read pointer generating circuit comprises:
a first multiplexer to multiplex between the corresponding leading edge pointer and corresponding read pointer responsive to the reload read pointer;
a shift circuit to generate a shifted signal by shifting a first multiplexer output signal; and
a second multiplexer to multiplex between the first multiplexer output signal and the shifted output signal responsive to the reload read pointer.

12. The alignment circuit of claim 10 wherein the alignment detection circuit further comprises a feedback circuit to generate the reload read pointer signal responsive to the parallel reference clock.

13. The alignment circuit of claim 12 wherein the feedback circuit comprises:
a logic gate to generate a logic gate signal by logically manipulating leading edge detect signals from each input data channel;
a plurality of serially connected registers to generate the reload read pointer signal by registering the logic gate signal responsive to the parallel reference clock.

14. An alignment circuit receiving input parallel data on a plurality of input parallel data channels and generating output parallel data transmissible on a plurality of output parallel data channels, the input parallel data on one input parallel data channel having skew relative to the input parallel data on other input parallel data channels, comprising:
an alignment detection circuit to generate a plurality of read pointers corresponding to the plurality of input parallel data channels responsive to a parallel reference clock signal; and
a plurality of FIFO circuits corresponding to the plurality of input parallel data channels to generate the output parallel data responsive to the plurality of read pointers;
wherein the output data on one output channel has no skew relative to the output data on other output channels;
wherein each FIFO circuit comprises:
a plurality of FIFO latches, each FIFO latch to store a word of input data responsive to a corresponding pixel clock;
a compare circuit to generate a match bit for each word of input data by monitoring the input data for a code;
a register circuit to generate a leading edge signal responsive to the corresponding pixel clock;
a counter circuit to generate a write pointer responsive to the corresponding pixel clock;
a latch circuit to generate a leading edge pointer by latching the write pointer responsive to the leading edge signal and the corresponding pixel clock; and
a multiplexer circuit to receive input data stored in the plurality of FIFO latches and output aligned input data to a corresponding input data channel responsive to a corresponding read pointer.

15. The alignment circuit of claim 14 wherein the code is a DVI blanking code.

16. The alignment circuit of claim 14 wherein the counter circuit generates an enable signal responsive to the corresponding pixel clock and a reset signal and wherein each FIFO latch is enabled by the enable signal.

17. The alignment circuit of claim 14 wherein the logic circuit generates the leading edge signal by logically manipulating the match bit of a presently stored data word with a match bit of a previously stored data word responsive to corresponding pixel clock.

18. A method for aligning parallel image data, comprising:

receiving the data on a plurality of channels, the data on one channel having skew relative to the data on another channel;

storing the data in a plurality of queues;

detecting a valid data transition by checking the data for a predetermined code;

setting a read pointer for each channel responsive to the valid data transition; and aligning the data by reading the plurality of queues once the read pointers for each of the channels point to a valid data transition;

wherein detecting a valid data transition comprises scanning each word of data for the code; and wherein detecting a valid data transition comprises:
storing the code for a previous word of data;
storing the code for a present word of data; and
comparing the code for the previous with the code for the present word of data.

19. The method of claim 18 wherein receiving the data comprises:

receiving serial data on a plurality of serial channels;

converting the serial data to parallel data; and providing the parallel data to a plurality of parallel channels.

20. The method of claim 18 wherein storing the data in a plurality of queues includes for each channel storing a word of data in a plurality of FIFO latches responsive to a corresponding pixel clock.

21. The method of claim 18 wherein detecting a valid data transition includes generating a leading edge signal as a result of comparing the code.

22. The method of claim 21 wherein detecting a valid data transition includes:

generating a write pointer responsive to the pixel clock; and generating a leading edge pointer by latching the write pointer responsive to the leading edge signal and the pixel clock.

23. The method of claim 22 wherein setting the read pointer includes:

generating a reload read pointer by logically manipulating the leading edge signal from each data channel; and latching the leading edge pointer responsive to the reload read pointer.

24. The method of claim 23 wherein aligning the data by reading the plurality of queues includes:

multiplexing data from the plurality of FIFO latches to a corresponding data channel responsive to the read pointer, wherein multiplexed data provided to one data channel is aligned relative to other multiplexed data provided to other data channels.

* * * * *

UNITED STATES PATENT AND TRADEMARK OFFICE
CERTIFICATE OF CORRECTION

PATENT NO. : 6,917,366 B1 Page 1 of 1
APPLICATION NO. : 09/826538
DATED : July 12, 2005
INVENTOR(S) : West et al.

It is certified that error appears in the above-identified patent and that said Letters Patent is hereby corrected as shown below:

At column 2, line 60 please replace "e.g., charnel 108A," with --e.g., channel 108A--

Signed and Sealed this

Ninth Day of January, 2007

JON W. DUDAS
*Director of the United States Patent and Trademark Office*